(No Model.)
A. LOEHNER.
NUT LOCK.
No. 462,318. Patented Nov. 3, 1891.
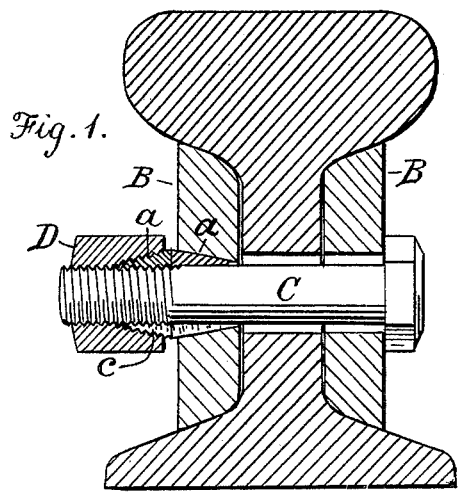
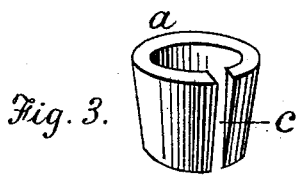
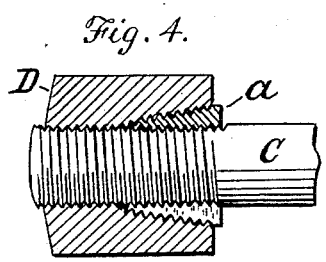
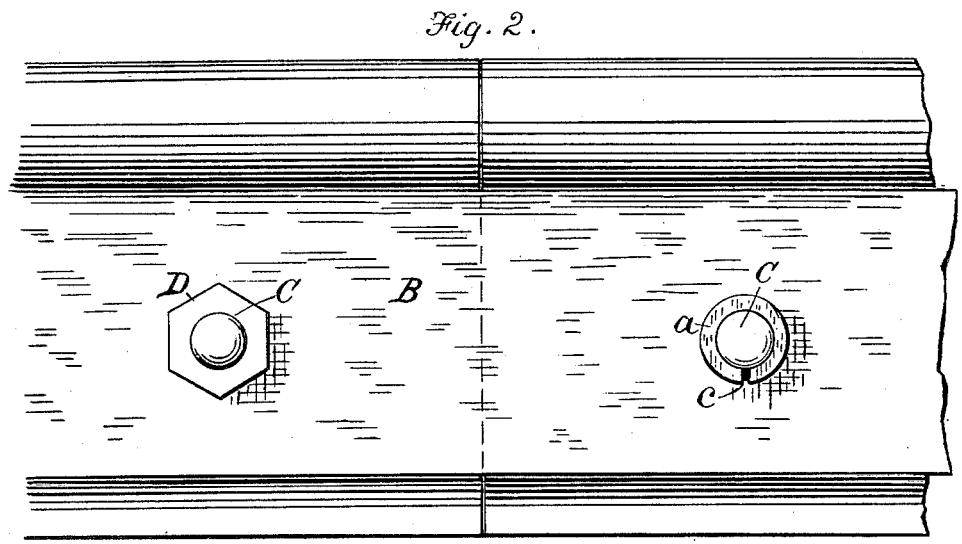
Witnesses:
G. B. Towles.
John J. Halsted
Inventor:
August Loehner
By H. A. Daniels
Attorney

UNITED STATES PATENT OFFICE.

AUGUST LOEHNER, OF ST. LOUIS, MISSOURI.

NUT-LOCK.

SPECIFICATION forming part of Letters Patent No. 462,318, dated November 3, 1891.

Application filed January 3, 1889. Serial No. 295,378. (No model.)

*To all whom it may concern:*

Be it known that I, AUGUST LOEHNER, a citizen of the United States, residing at St. Louis, in the State of Missouri, have invented certain new and useful Improvements in Fastening Devices for Nuts and Bolts, of which the following is a specification, reference being had therein to the accompanying drawings.

This invention relates to nut and bolt fastenings for fish-bars at the joints of railway-rails, studs, and other devices, to which my improvements may be adapted; and it consists in certain improvements in such fastenings, as hereinafter described and claimed.

In the accompanying drawings, Figure 1 represents a vertical transverse section of a railway-rail and fish-bars with my improved fastening applied thereto. Fig. 2 is a side view of the same. Fig. 3 represents one of the conical friction-rings employed in the fastening. Fig. 4 shows in section the nut and friction-ring on a bolt.

A designates the railway-rails, and B the fish-bars in their usual positions.

C indicates the fastening-bolt, which is passed through apertures in the rail and fish-bars, the said bolt being threaded a suitable distance from the end where the securing-nut is applied. Some of the bolt-holes in the fish-bars are reamed out or so formed that they flare outward, as shown in Fig. 1, to receive the conical friction or compression rings $a$, the said rings being made tapering on their outer surfaces to fit in the flaring bolt-holes. Each of said rings $a$ has in its side a slit or opening $c$, which is closed by the compression of the ring when the nut is screwed on the bolt and the fastening is adjusted. The friction-rings are formed of copper, brass, or other metal of less hardness than that of which the bolt or the nut is formed, the latter being either of steel or iron, so that when the fastening is secured by wrenching the nut threads will be formed by the threaded bolt and nut on the friction-rings, which are in contact with them.

D indicates the securing-nut, the threaded aperture through which is made flaring from the center of the nut to its base or inward side, so that the outer half of the nut connects with the screw-bolt and the threaded inner half closes on the conical compression-ring $a$, which is in position on the bolt and tapers outward, as shown.

In adjusting the fastening to fish-bars at a joint of rails a bolt C is passed through bolt-holes in the opposite fish-bars and rail, the threaded part of said bolt extending through a flaring bolt-hole in a fish-bar, and a compression-ring $a$ is then placed on the bolt, the base of the ring being outward, and is pressed into the flaring aperture in the fish-bar. Another of said rings is then placed on the bolt, the base of the ring being inward, and is pressed against the last-mentioned ring, so that the bases of the two rings are in contact. The nut is then placed on the end of the bolt, and, being turned with a wrench, the rings are compressed and driven into their seats, respectively, and the rings, being of metal of less hardness than that of the other parts, will yield somewhat to the pressure and become tightly fitted. As the nut is screwed on, screw-threads corresponding with those on the bolt and nut are formed on the tapering rings, which are in contact with the said threaded bolt and nut. Thus a firm and durable fastening is produced, which will withstand the jarring or vibration of parts caused by passing trains or the operation of heavy machinery, the device being adapted for use in the construction of various mechanical devices.

The compression-ring may be formed of a strip of metal with its ends reduced in thickness, the strip being bent into shape so that one end overlaps the other.

I claim—

The combination, with a screw-bolt C, of one or more plates provided with flaring bolt-holes, two tapering rings placed on said bolt with their bases adjoining, as shown, and a nut, the threaded bolt-hole of which is made partly flaring, so that it incloses the outer tapering ring, substantially as and for the purpose described.

In testimony whereof I have affixed my signature in presence of two witnesses.

AUGUST LOEHNER.

Witnesses:
WILLIAM HUMMERT,
ADOLPH SOBECK.